United States Patent [19]
Otonari

[11] Patent Number: 5,818,831
[45] Date of Patent: Oct. 6, 1998

[54] DIGITAL RADIO COMMUNICATION APPARATUS

[75] Inventor: Miki Otonari, Fukuoka, Japan

[73] Assignee: Matsushita Electric Industrial Co., Ltd., Kadoma, Japan

[21] Appl. No.: 670,668

[22] Filed: Jun. 26, 1996

[30] Foreign Application Priority Data

Jul. 5, 1995 [JP] Japan ................................. 7-169475

[51] Int. Cl.⁶ ................................................ H04J 3/16
[52] U.S. Cl. ........................................ 370/347; 370/442
[58] Field of Search ................................. 370/310, 311, 370/312, 314, 321, 337, 347, 348, 389, 229, 247, 251, 252, 254, 319, 322, 326, 329, 324, 336, 341, 343, 344, 345, 346, 442, 459, 477; 455/422

[56] References Cited

U.S. PATENT DOCUMENTS 4,715,033  12/1987  Saburi ..................................... 370/321
4,800,560  1/1989  Aoki et al. .............................. 370/324

*Primary Examiner*—Dang Ton
*Attorney, Agent, or Firm*—Spencer & Frank

[57] ABSTRACT

In a digital radio communication apparatus which carries out radio communication on the basis of TDMA/TDD, the monitoring operation is carried out instead of the transmission operation at the transmission timing of a private station. It is possible to monitor the state of the transmission TDMA slot of the private station and hence it is made possible to carry out the radio communication in a good state at all times.

5 Claims, 9 Drawing Sheets

DIGITAL RADIO COMMUNICATION APPARATUS

BACKGROUND OF THE INVENTION

The present invention relates to a digital radio communication apparatus which carries out radio communication by Time Division Multiple Access/Time Division Duplex.

With a digital radio communication apparatus for carrying out the radio communication by Time Division Multiple Access/Time Division Duplex (hereinafter, referred to as "TDMA/TDD" for short, when applicable), for the purpose of effective frequency utilization and so that for many radio communication can to be carried out on one frequency, as shown in FIG. 8, respective stations carry out the radio communication on the basis of a method wherein the timing (TDMA slots) at which the one frequency is used, and out of that timing, the timing for the transmission operation (transmission TDMA slot) and the timing for the reception operation (reception TDMA slot) are determined by the time division.

The configuration of a conventional digital telephone will hereinafter be described with reference to the block diagram of FIG. 7.

Referring to FIG. 7, reference numeral 1 designates a private station, and reference numeral 2 designates the other station with which the private station will carry out the radio communication. In the private station 1, reference numeral 11 designates a first antenna through which a radio signal is transmitted/received to/from the other station 2, reference numeral 12 designates a first radio processing unit for modulating/demodulating the radio signal, reference numeral 13 designates a first control unit for controlling the private station 1, and reference numeral 14 designates an interface (I/F) unit to which a speech processing unit including a microphone 18 for inputting a voice or a sound signal therethrough and a speaker 19 for outputting the voice or the sound signal therethrough, a computer 20, a cable circuit 21, other apparatuses 22 and the like are connected.

Reference numeral 15 designates a first storage unit for storing therein data relating to a frequency for the radio communication and data relating to timing of the transmission/reception TDMA slot, and reference numeral 16 designates a third storage unit for storing therein data relating to a state of the reception TDMA slot, a threshold for use in monitoring the state of the reception TDMA slot, the number by which the state of the reception TDMA slot exceeds continuously the threshold, and a threshold for the number by which the frequency and the TDMA slot are required to be changed.

On the other hand, in the other station 2, reference numeral 51 designates a second antenna through which a radio signal is transmitted/received to/from the private station 1, reference numeral 52 designates a second radio signal processing unit for modulating/demodulating the radio signal, reference numeral 53 designates a second control unit for controlling the other station 2, and reference numeral 54 designates a second I/F unit to which a microphone 57 for inputting a voice or a sound signal therethrough, a speaker 58 for outputting the voice or the sound signal therethrough, a computer 59, a cable circuit 60, other apparatuses 61, and the like are connected.

Reference numeral 55 designates a second storage unit for storing therein data relating to a frequency for the radio communication and data relating to the timing of the transmission/reception TDMA slot, and reference numeral 56 designates a fourth storage unit for storing therein data relating to a state of the reception TDMA slot, a threshold for use in monitoring of the state of the reception TDMA slot, the number by which the state of the reception TDMA slot exceeds continuously the threshold, and a threshold for the number by which the frequency or the TDMA slot is required to be changed.

A description will hereinbelow be given with respect to the simple radio communication operation of the digital telephone having the above-mentioned configuration with reference to the timing chart of FIG. 8.

Under control of the first control unit 13, the private station 1 modulates either the information which has been produced by the first control unit 13, or the information which has been inputted through the first I/F unit 14 into a radio signal in the first radio signal processing unit 12, and transmits the radio signal to the other station 2 through the first antenna 11 in the transmission TDMA slot T1 at the assigned frequency the data of which is stored in the first storage unit 15. In addition, under control of the first control unit 13, the private station 1 receives a radio signal through the first antenna 11 in the reception TDMA slot T2 at the assigned frequency, the data of which is stored in the first storage unit 15. Then, the radio signal thus received is demodulated in the first radio signal processing unit 12, and then is either outputted through the first I/F unit 14 or processed in the first control unit 13. The other station 2 also carries out substantially the same operation as that of the private station 1. That is, under the control by the second control unit 53, the radio signal is transmitted/received to/from the private station 1 using the second antenna 51, the second radio signal processing unit 52, the second I/F unit 54, and the second storage unit 55.

In the above-mentioned system, under control of the first and second control units 13 and 53, the radio communication is carried out between the private station 1 and the other station 2. For example, the user of the private station 1 and the user of the other station 2 can communicate with each other through their microphones and speaker, and also the data can be exchanged between the computer connected to the private station 1 and the computer connected to the other station 2.

While the radio communication is carried out, the private station monitors the state of reception of the radio signal from the other station 2 at all times. If the reception state is undesirable, then it is necessary to change the frequency and the transmission/reception TDMA slot for use in the radio communication.

The private station 1 monitors the state of the radio communication by observing the reception TDMA slot T2. Then, the private station 1 informs the other station of the monitor information using its transmission TDMA slot when the state of reception of the radio signal in the reception TDMA slot T2 is undesirable, and then changes the frequency at which the radio communication is being carried out and the transmission/reception TDMA slot, whereby radio communication in the good state can be made possible.

Next, the description will hereinbelow be given with respect to the operation of monitoring the state of the reception TDMA slot T2, which is carried out by the first control unit 13 of the private station 1, with reference to a flow chart of FIG. 9.

At the time when it becomes the timing of the reception TDMA slot T2 the data of which is stored in the first storage unit 15, the processing proceeds to Step 2. If it does not still become that timing, then the operation of Step 1 is repeatedly carried out (Step 1).

When it is judged in Step 1 that the processing will proceed to Step 2, the first radio signal processing unit 13 is controlled to allow the private station 1 to receive the radio signal and also to monitor the reception state (Step 2). Then, the data relating to the monitor result is stored in the third storage unit 16 (Step 3).

If as the monitor result in Step 3, the state of the reception TDMA slot T2 does not exceed a threshold for the state monitoring, then the processing proceeds to Step 5. If the state of the reception TDMA slot T2 exceeds that threshold, then the processing proceeds to Step 6.

When it is judged in Step 4 that the processing will proceed to Step 5, the value of the number by which the state of the reception TDMA slot T2 exceeds the threshold for the state monitoring stored in the third storage unit 16 is reset to zero, and then the processing is returned to Step 1.

In addition, when it is judged in Step 4 that the processing will proceed to Step 6, the value of the number by which the state of the reception TDMA slot T2 exceeds the threshold for the state monitoring stored in the third storage unit 16 is incremented by one and then is stored (Step 6). Then, when the stored value of the number by which the state of the reception TDMA slot T2 exceeds the threshold for the state monitoring does not exceed the threshold of the number by which the frequency and the TDMA slot are required to be changed (Step 7), the processing is returned to Step 1. On the other hand, when the stored value of the number by which the state of the reception TDMA slot T2 exceeds the threshold for the state monitoring exceeds the threshold of the number by which the frequency and the TDMA slot are required to be changed (Step 7), the processing proceeds to Step 8.

When it is judged in Step 7 that the processing will proceed to Step 8, the first radio signal processing unit 12 is controlled so that the information of the request for changing the frequency or the TDMA slot is transmitted to the other station (Step 8).

Thereafter, at the time when the first radio signal processing unit 12 receives the information of the response for allowing the frequency or the TDMA slot to be changed from the other station (Step 9), the frequency or the TDMA slot T2, for use in the radio communication, which is stored in the first storage unit 15 is changed and then is stored (Step 10). Then, the processing is returned to Step 1.

In the above-mentioned method, however, only the timing of the reception TDMA slot of the private station, i.e., only the timing state of the transmission TDMA slot of the other station can be monitored. As a result, when the information of monitoring the reception state can not be transmitted from the other station, when the other station does not have the function of monitoring the reception state, and when the other station is not existent, the state of the radio communication of the transmission TDMA slot of the private station can not be recognized. Therefore, even though the reception TDMA slot can be monitored, the transmission TDMA slot can not be monitored at all. Then, even if the interference occurs in the transmission TDMA slot, this fact can not be recognized by the private station. As a result, it is impossible to change the frequency and the TDMA slot at which the radio communication is being carried out, and hence the radio communication may not be carried out in a good state in some cases. This is a problem.

SUMMARY OF THE INVENTION

The present invention was made in order to solve the above-mention problem associated with the prior art, and it is therefore an object of the present invention to provide a digital radio communication apparatus which is capable of carrying out radio communication in a good state at all times by monitoring the state of the transmission TDMA slot.

In order to solve the above-mentioned problem associated with the prior-art, according to the present invention, the counting operation is carried out for every timing at which the radio transmission should be carried out. Then, at the time when the counted value reaches a predetermined value, the transmission operation is not carried out, but the reception operation is carried out at that timing, and the transmission timing is changed on the basis of the reception result.

In addition, the digital radio communication apparatus of the present invention has a table which is used to judge whether or not the transmission operation should be carried out. This table is referred to at every timing at which the transmission operation should be carried out. As the result of referring to the table, if it is judged that the transmission operation is not carried out, then the transmission operation is not carried out, but the reception operation is carried out at that timing. On the basis of the reception result, the transmission timing is changed.

By adopting this structure, the slot state in the transmission slot can be grasped, and also the avoidance from interference can be accurately carried out.

In addition, a table is provided which is used to judge whether or not the transmission operation should be carried out, that table being referred every timing at which the transmission operation should be carried out, and in accordance with the reference result, it is judged whether or not the transmission operation should be carried out, whereby the periodical interference can be grasped and also it is possible to avoid accurately interference.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

(Embodiment 1)

A first embodiment of the present invention will hereinbelow be described in detail. Firstly, a configuration of the present embodiment will now be described with reference to a block diagram of FIG. 1.

Figure 1:
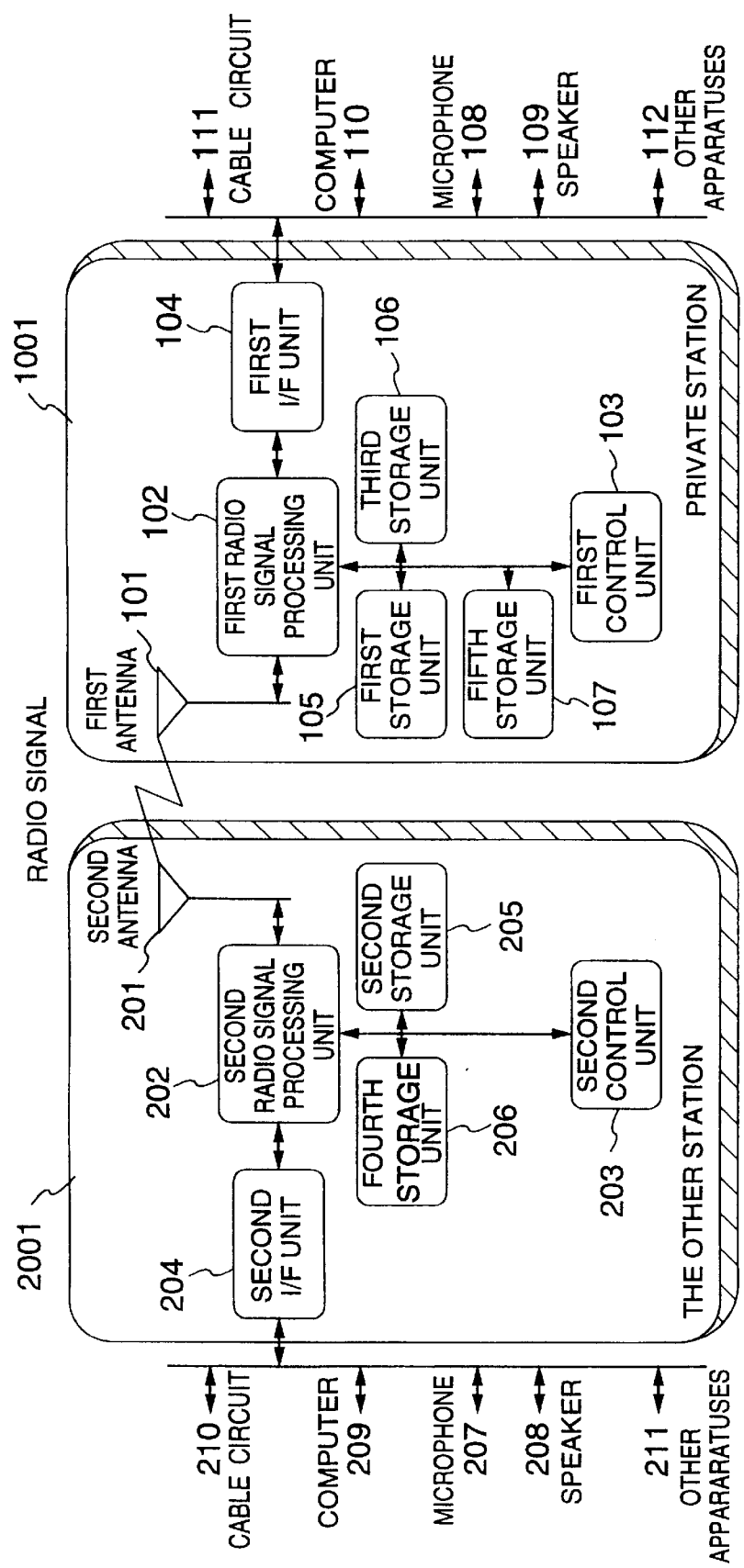
FIG. 1 is a block diagram showing a configuration of a radio communication apparatus according to a first embodiment of the present invention.

Referring to FIG. 1, reference numeral 1001 designates a private station, and reference numeral 2001 designates the other station which carries out the radio communication with the private station 1001. In the private station 1001, reference numeral 101 designates a first antenna through which a radio signal is transmitted/received to/from the other station 2001, reference numeral 102 designates a first radio signal processing unit for modulating/demodulating the radio signal, reference numeral 103 designates a first control unit for controlling the private station 1001, and reference numeral 104 designates a first interface (I/F) unit to which a microphone 108 for inputting a voice or a sound signal therethrough, a speaker 109 for outputting the voice or the sound signal therethrough, a computer 110, a cable circuit 111, other apparatuses 112 and the like are connected. Reference numeral 105 designates a first storage unit for storing therein data relating to a frequency for the radio communication and data relating to timing of the transmission/reception TDMA slot, reference numeral 106 designates a third storage unit for storing therein data relating to a state of a reception TDMA slot, a threshold which is used to monitor the state of the reception TDMA slot, the number by which the state of the reception TDMA slot exceeds continuously the threshold, and a threshold for the number by which the frequency and the TDMA slot are required to be changed, and reference numeral 107 designates a fifth storage unit for storing therein data relating to a state of a transmission TDMA slot, a threshold which is used to monitor the state of the transmission TDMA slot, the number by which the state of the transmission TDMA slot exceeds continuously the threshold, and a threshold for the number by which the frequency and the TDMA slot are required to be changed.

In addition, in the other station 2001, reference numeral 201 designates a second antenna through which a radio signal is transmitted/received to/from the private station 1001, reference numeral 202 designates a second radio signal processing unit for modulating/demodulating the radio signal, reference numeral 203 designates a second control unit for controlling the other station 2001, and reference numeral 204 designates a second I/F unit to which a microphone 207 for inputting a voice or a sound signal therethrough, a speaker 208 for outputting the voice or the sound signal therethrough, a computer 209, a cable circuit 210, other apparatuses 211 and the like are connected. Reference numeral 205 designates a second storage unit for storing therein data relating a frequency for the radio communication and data relating to timing of the transmission/reception TDMA slot, and reference numeral 206 designates a fourth storage unit for storing therein data relating to a state of the reception TDMA slot, a threshold which is used to monitor the state of the reception TDMA slot, the number by which the state of the reception TDMA slot exceeds continuously the threshold, and a threshold for the number by which the frequency and the TDMA slot are required to be changed.

The description will hereinbelow be given with respect to the simple radio communication operation of the digital telephone set configured as described above with reference to a timing chart of FIG. 2.

Under the control by the first control unit 103, the private station 1001 modulates either the information which has been produced in the first control unit 103, or the information which has been inputted through the first I/F unit 104 into a radio signal in the first radio signal processing unit 102, and then transmits the radio signal to the other station 2001 through the first antenna 101 in the transmission TDMA slot T1 at the assigned frequency the data of which is stored in the first storage unit 105.

In addition, under the control by the first control unit 103, the private station 1001 receives a radio signal through the first antenna 101 in the reception TDMA slot T2 at the assigned frequency the data of which is stored in the first storage unit 105. Then, the radio signal thus received is demodulated in the first radio signal processing unit 102 and is either outputted through the first I/F unit 104 or processed in the first control unit 103.

On the other hand, the other station 2001 also carries out the operation similar to that of the private station 1001. That is, under control of the second control unit 203, the other station 2001 transmits/receives the radio signal to/from the private station 1001 using the second antenna 201, the second radio signal processing unit 202, the second I/F unit 204, and the second storage unit 205.

In the above-mentioned system, under control of the first and second control units 103 and 203, the radio communication is carried out between the private station 1001 and the other station 2001. For example, the user of the private station 1001 and the user of the other station 2001 can communicate with each other through their microphones and speaker, and also the data can be exchanged between the computer connected to the private station 1001 and the computer connected to the other station 2001.

While the radio communication is carried out, the private station 1001 monitors the state of reception of the radio signal from the other station 2001 at all times. If the reception state is undesirable, then it is necessary to change the frequency and the transmission/reception TDMA slot which are used to carry out the radio communication. In this connection, the operation of monitoring the reception TDMA slot T2 in the private station 1001 is substantially the same as that in the prior art.

Figure 2:
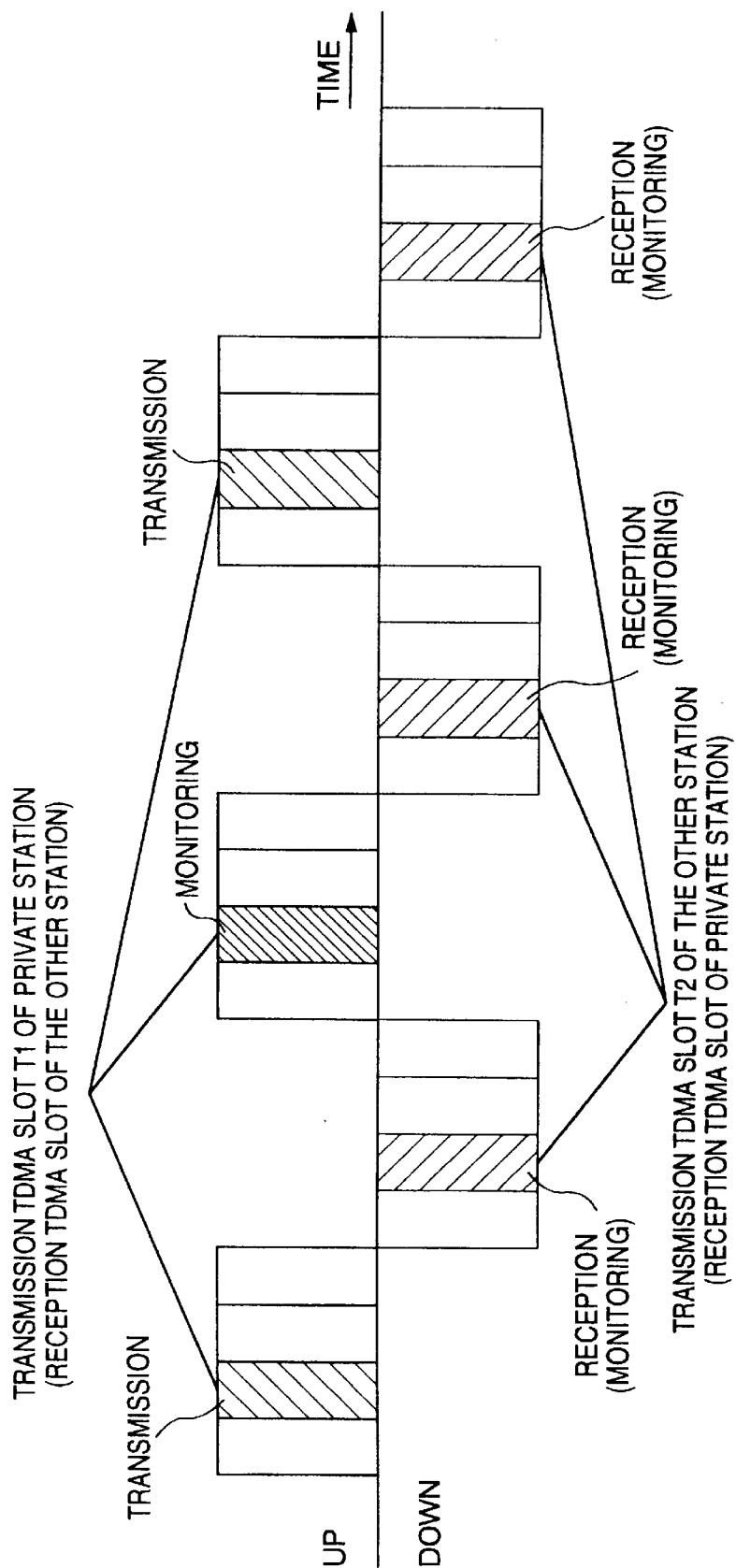
FIG. 2 is a timing chart showing a TDMA slot of the radio communication apparatus shown in FIG. 1.

At this time, the private station 1001 monitors the state of the transmission TDMA slot in which the radio signal is transmitted to the other station (refer to FIG. 2). If the state of the transmission TDMA slot is found to be undesirable, then it is necessary to change the frequency and the transmission/reception TDMA slot which are used to carry out the radio communication.

Figure 3:
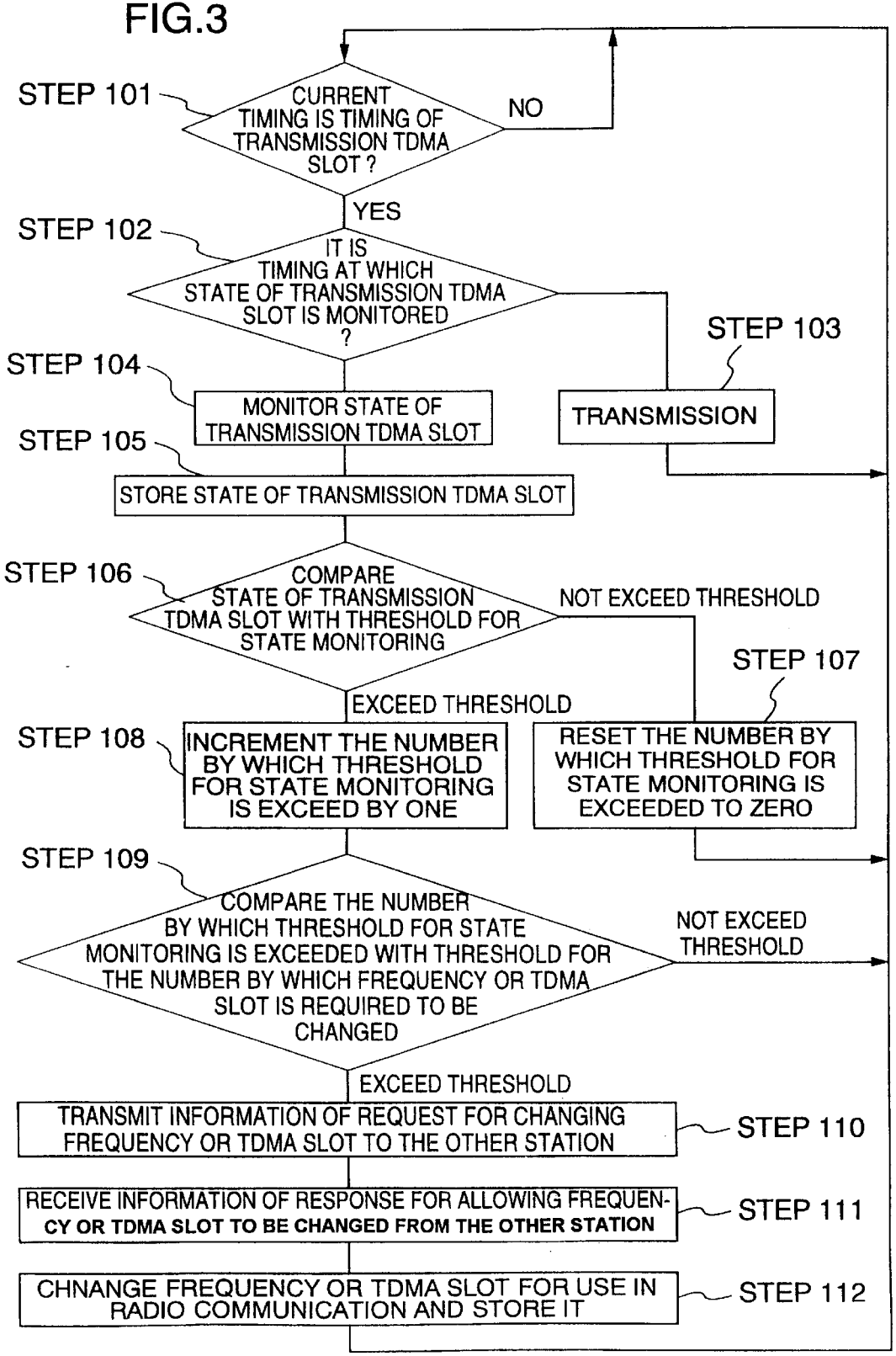
FIG. 3 is a flow chart useful in explaining the operation of the radio communication apparatus shown in FIG. 1.

The description will hereinbelow be given with respect to the control for the operation of monitoring the state of the transmission TDMA slot of the private station 1001, which is carried out by the first control unit 103, with reference to FIG. 3.

Firstly, it is judged whether or not the current timing is the timing of the transmission TDMA slot, the data of which is storaged in the first storage unit 105. If so, then the processing proceeds to Step 102. If not, then the operation in Step 101 is repeatedly carried out. In the case where it is judged in Step 101 that the processing proceeds to Step 102, if it is not the timing at which the state of the transmission TDMA slot is monitored, then the processing proceeds to Step 103. If it is the timing at which the state of the transmission TDMA slot is monitored, then the processing proceeds to Step 104.

At this time, if it is judged in Step 102 that the processing proceeds to Step 103, then the first radio signal processing unit 102 is controlled so as to transmit the radio signal and the processing is returned to Step 101.

On the other hand, if it is judged in Step 102 that the processing proceeds to Step 104, then the control for transmission of the radio signal as in Step 103 is not carried out. Alternatively, the first radio signal processing unit 102 monitors the state of the transmission TDMA slot (Step 104). Thereafter, the data relating to the state of the transmission TDMA slot thus monitored is stored in the fifth storage unit 107 (Step 105).

Thereafter, it is judged whether or not the value relating to the state of the transmission TDMA slot, which has been stored in the fifth storage unit 107, exceeds a threshold for the state monitoring (Step 106). If not, then the processing proceeds to Step 107. If so, then the processing proceeds to Step 108.

At this time, when it is judged in Step 106 that the processing proceeds to Step 107, the value of the number by which the value relating to the state of the transmission TDMA slot exceeds the threshold for the state monitoring which is stored in the fifth storage unit 107 is reset to zero, and then the processing is returned to Step 101.

On the other hand, when it is judged in Step 106 that the processing proceeds to Step 108, the value of the number by which the value relating to the state of the transmission TDMA slot exceeds the threshold for the state monitoring which is stored in the fifth storage unit 107 is incremented by one and then is stored in the fifth storage unit 107 again (Step 108).

After executing the processing of Step 108, it is judged whether or not the value of the number by which the value relating to the state of the transmission TDMA slot exceeds the threshold for the state monitoring which is stored in the fifth storage unit 107 exceeds a predetermined value (it is set to the value of the number by which the frequency and the TDMA slot are required to be changed in the present embodiment). If not, then the processing is returned to Step 101 (Step 109). If so, then the processing proceeds to Step 110.

Now, in the case where it is judged in Step 109 that the processing proceeds to Step 110, the first radio signal processing unit 102 is controlled in such a way that the information of the request for changing the frequency or the TDMA slot is transmitted to the other station 2001 (Step 110). In addition, the first radio signal processing unit 102 is controlled in such a way that the information of the response for allowing the frequency or the TDMA slot to be changed is received from the other station 2001 through the first antenna 101 (Step 111).

Thereafter, the data relating to the changed frequency or TDMA slot which is used to carry out the radio communication is stored in the first storage unit 105. Then, the processing is returned to Step 101 (Step 112).

(Embodiment 2)

A second embodiment of the present invention will hereinbelow be described in detail with reference to the block diagram of FIG. 4.

Figure 4:
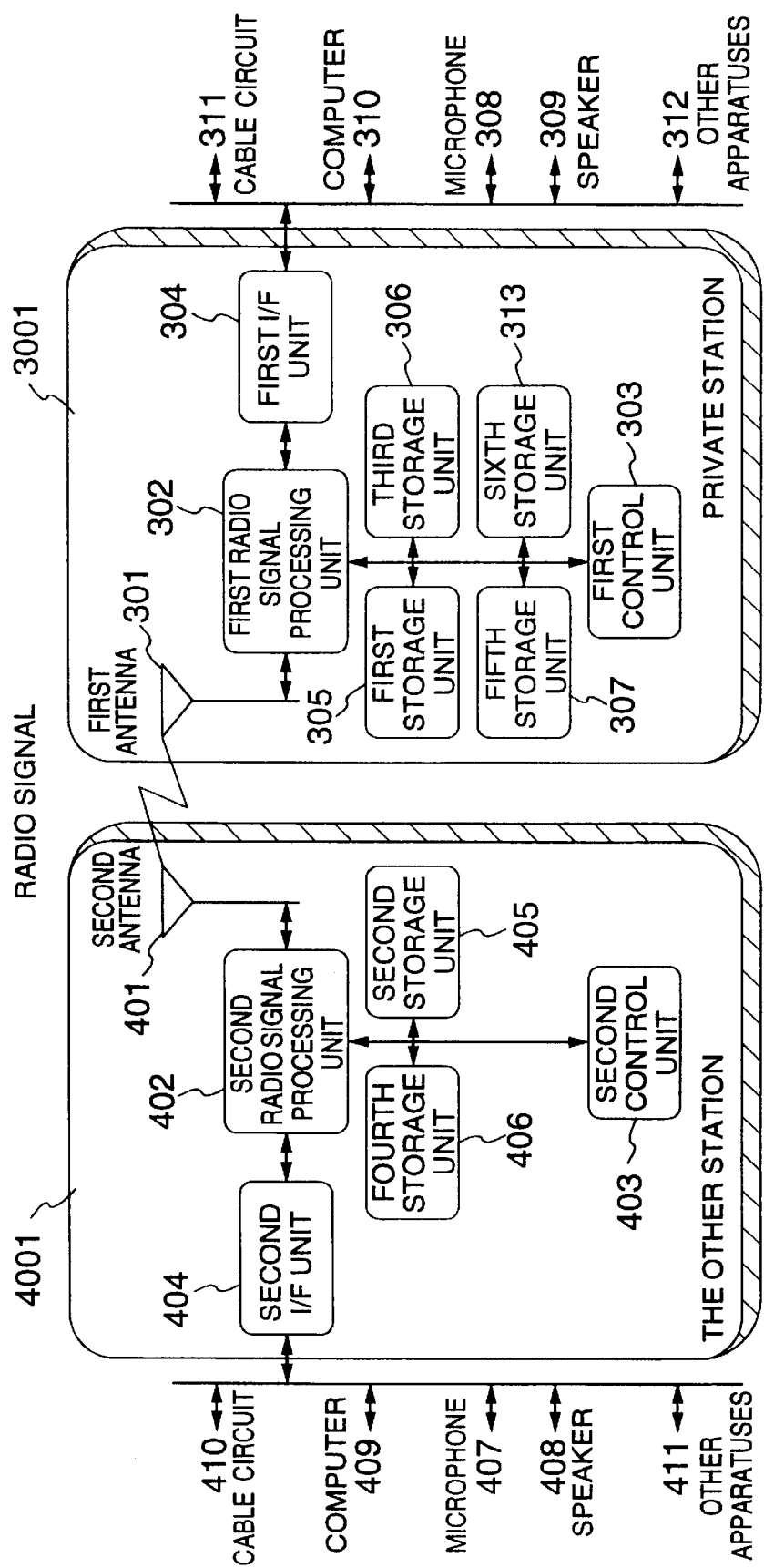
FIG. 4 is a block diagram showing a configuration of a radio communication apparatus according to a second embodiment of the present invention.

Referring to FIG. 4, reference numeral 3001 designates a private station, and reference numeral 4001 designates the other station which carries out the radio communication with the private station 3001. In the private station 3001, reference numeral 301 designates a first antenna through which a radio signal is transmitted/received to/from the other station 4001, reference numeral 302 designates a first radio signal processing unit for modulating/demodulating the radio signal, reference numeral 303 designates a first control unit for controlling the private station 3001, and reference numeral 304 designates a first I/F unit to which a microphone 308 for inputting a voice or a sound signal therethrough, a speaker 309 for outputting the voice or the sound signal therethrough, a computer 310, a cable circuit 311, other apparatuses 312 and the like are connected. Reference numeral 305 designates a first storage unit for storing therein data relating to a frequency for the radio communication and data relating to timing of a transmission/reception TDMA slot, reference numeral 306 designates a third storage unit for storing therein data relating to a state of the reception TDMA slot, a threshold which is used to monitor the state of the reception TDMA slot, the number by which the state of the reception TDMA slot exceeds continuously the threshold, and a threshold for the number by which the frequency and the TDMA slot are required to be changed, and reference numeral 307 designates a fifth storage unit for storing therein data relating to a state of the transmission TDMA slot, a threshold which is used to monitor the state of the transmission TDMA slot, the number by which the state of the transmission TDMA slot exceeds continuously the threshold, and a threshold for the number by which the frequency and the TDMA slot are required to be changed.

On the other hand, in the other station 4001, reference numeral 401 designates a second antenna through which a radio signal is transmitted/received to/from the private station 3001, reference numeral 402 designates a second radio signal processing unit for modulating/demodulating the radio signal, reference numeral 403 designates a second control unit for controlling the whole the other station 4001, and reference numeral 404 designates a second I/F unit to which a microphone 407 for inputting a voice or a sound signal therethrough, a speaker 408 for outputting the voice or the sound signal therethrough, a computer 409, a cable circuit 410, other apparatuses 411 and the like are connected. Reference numeral 405 designates a second storage unit for storing therein data relating to a frequency for the radio communication and data relating to timing of a transmission/reception TDMA slot, and reference numeral 406 designates a fourth storage unit for storing therein data relating to a state of the reception TDMA slot, a threshold which is used to monitor the state of the reception TDMA slot, the number by which the state of the reception TDMA slot exceeds continuously the-threshold, and a threshold for the number by which the frequency and the TDMA slot are required to be changed.

Figure 5:
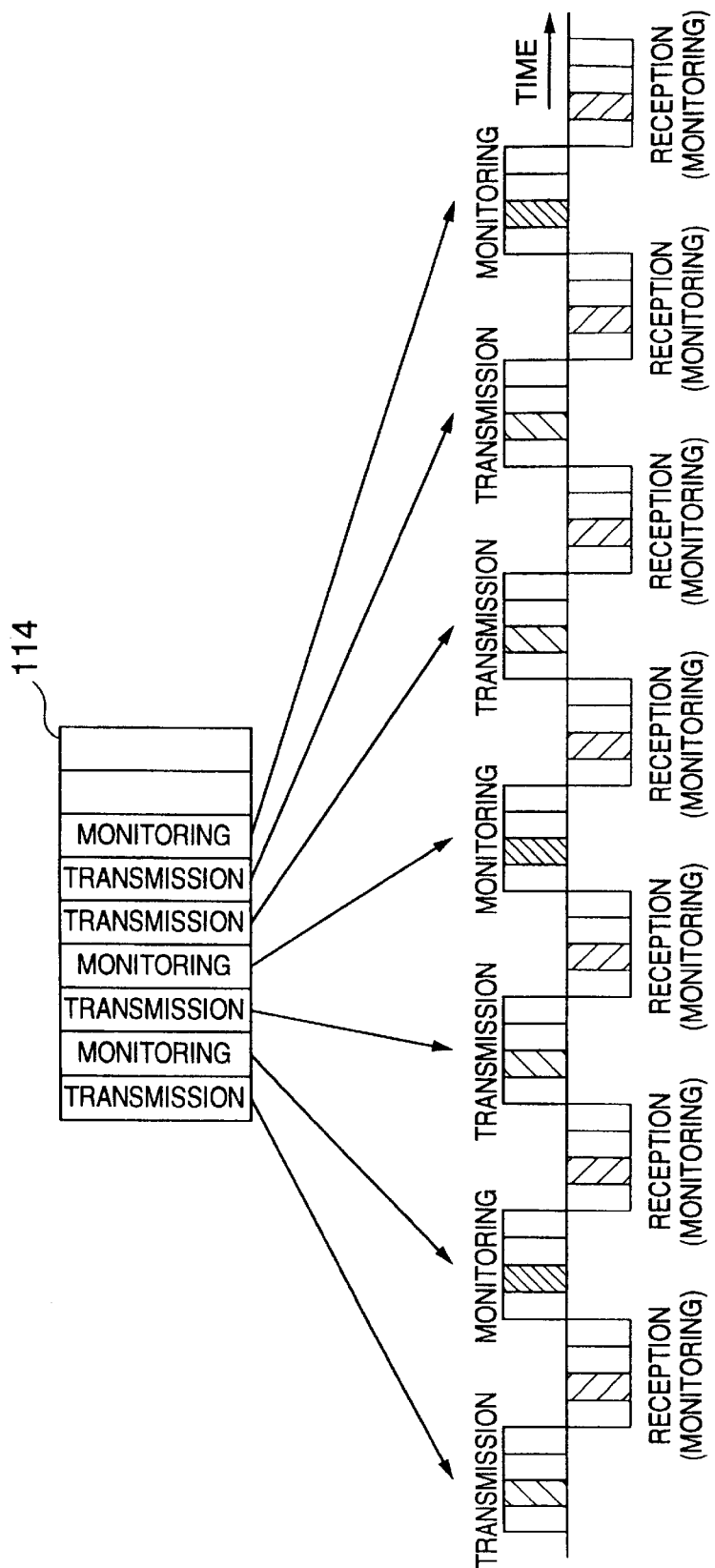
FIG. 5 is a timing chart showing a TDMA slot of the radio communication apparatus shown in FIG. 4.

The present embodiment is characterized by providing, in addition to the constituent elements in the above-mentioned structure, a sixth storage unit 313 for storing therein a table used to determine the timing at which the transmission TDMA slot is monitored. As shown in a table 114 of FIG. 5, the timing information of transmission and monitoring is stored in the sixth storage unit 313.

Figure 6:
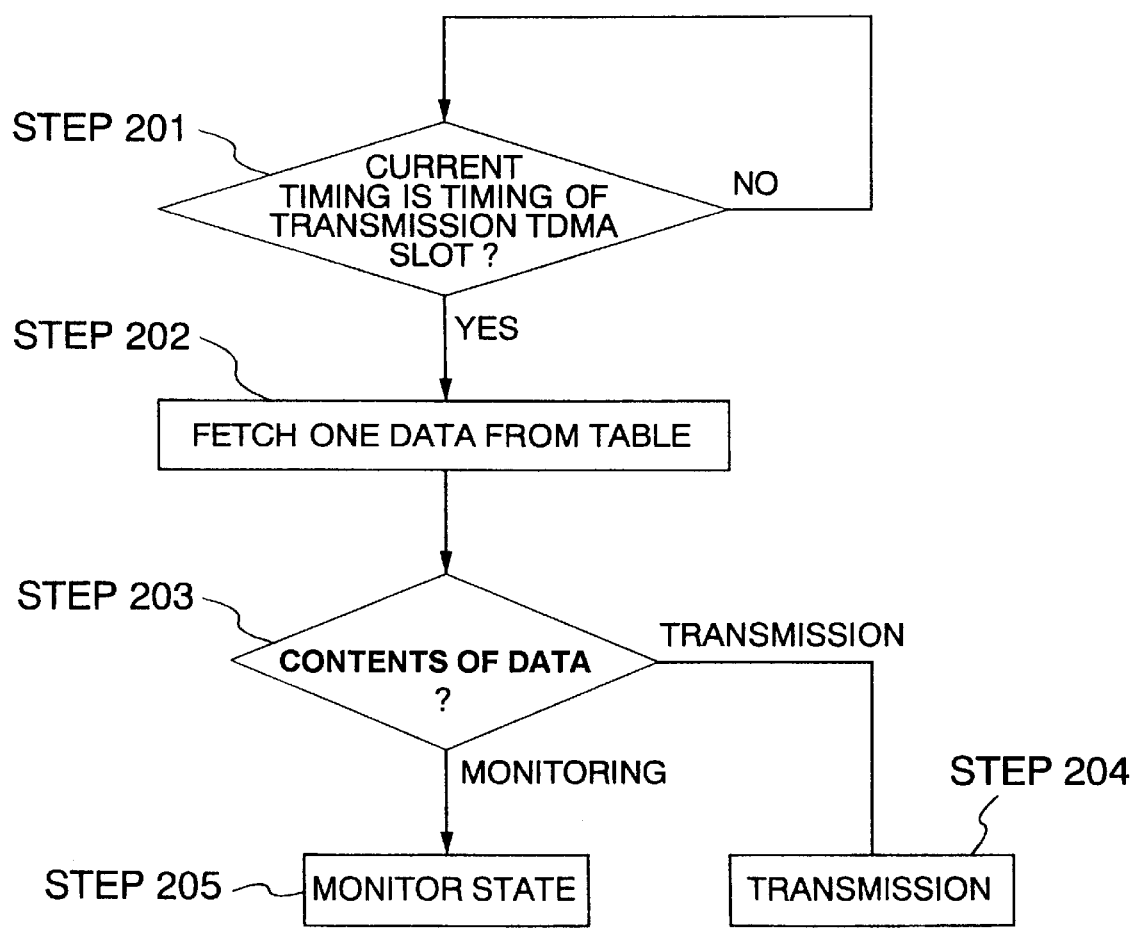
FIG. 6 is a flow chart useful in explaining the operation of the radio communication apparatus shown in FIG. 4.
Figure 7:
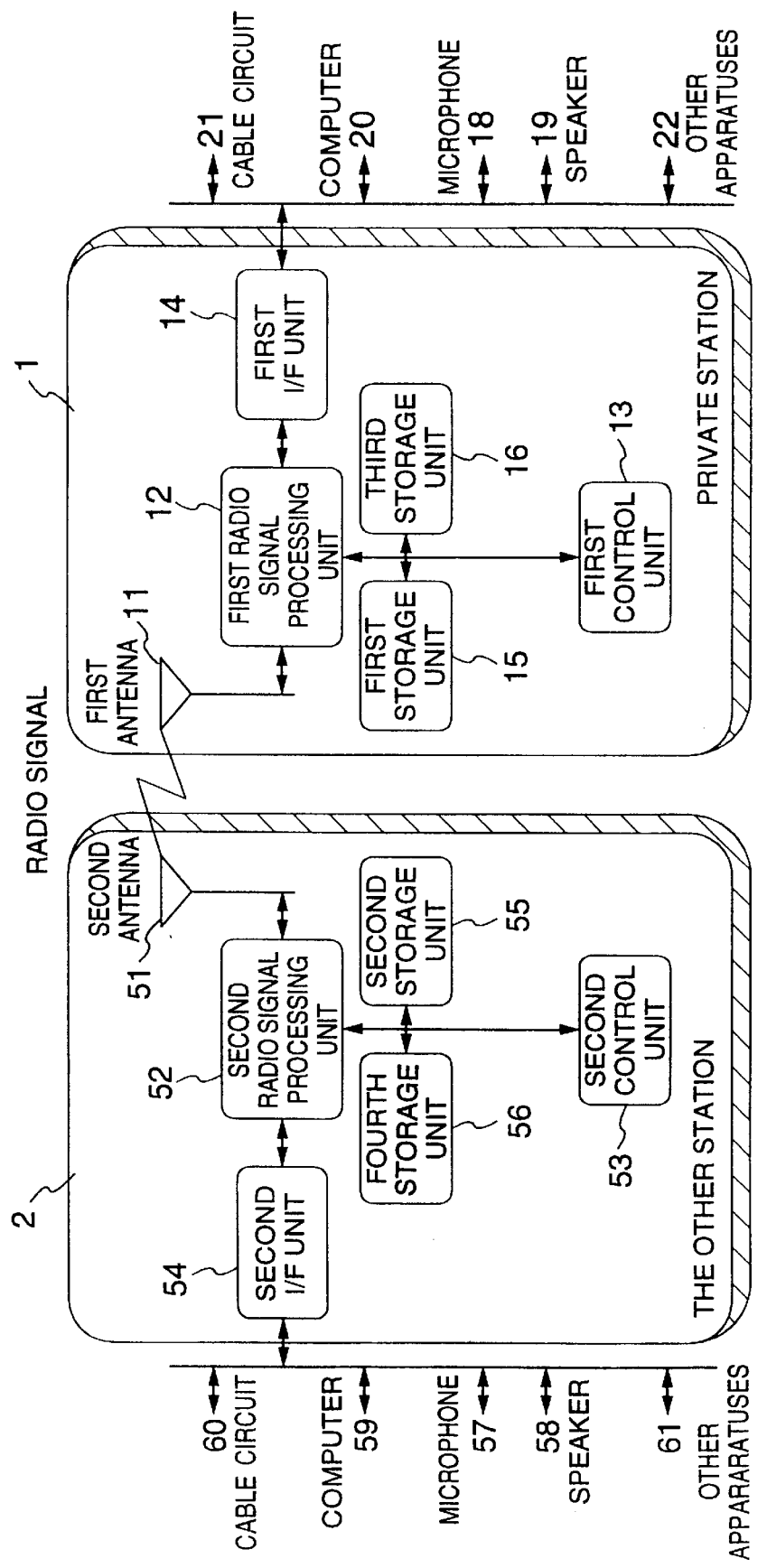
FIG. 7 is a block diagram showing a configuration of a conventional radio communication apparatus.
Figure 8:
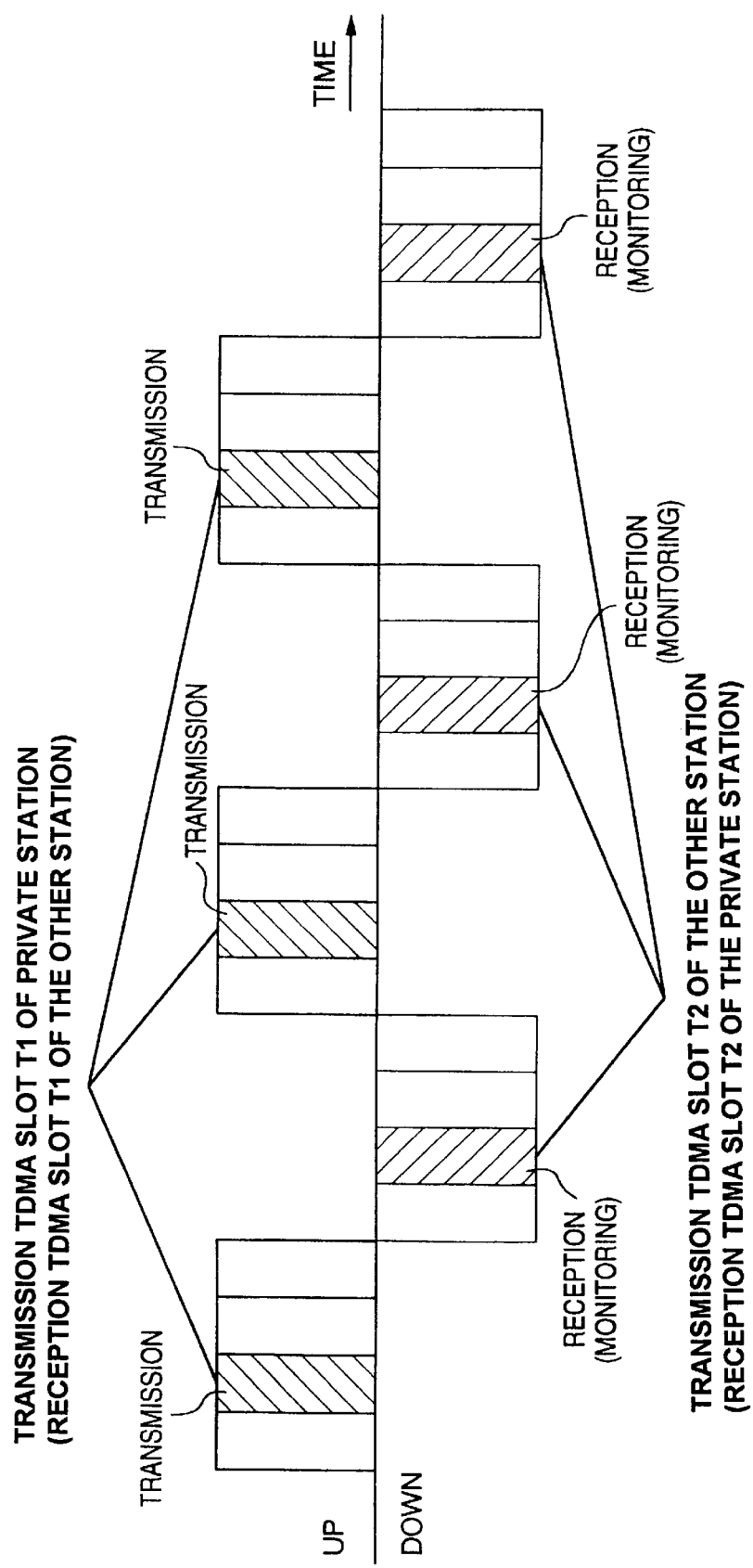
FIG. 8 is a timing chart showing a TDMA slot of the radio communication apparatus shown in FIG. 7.
Figure 9:
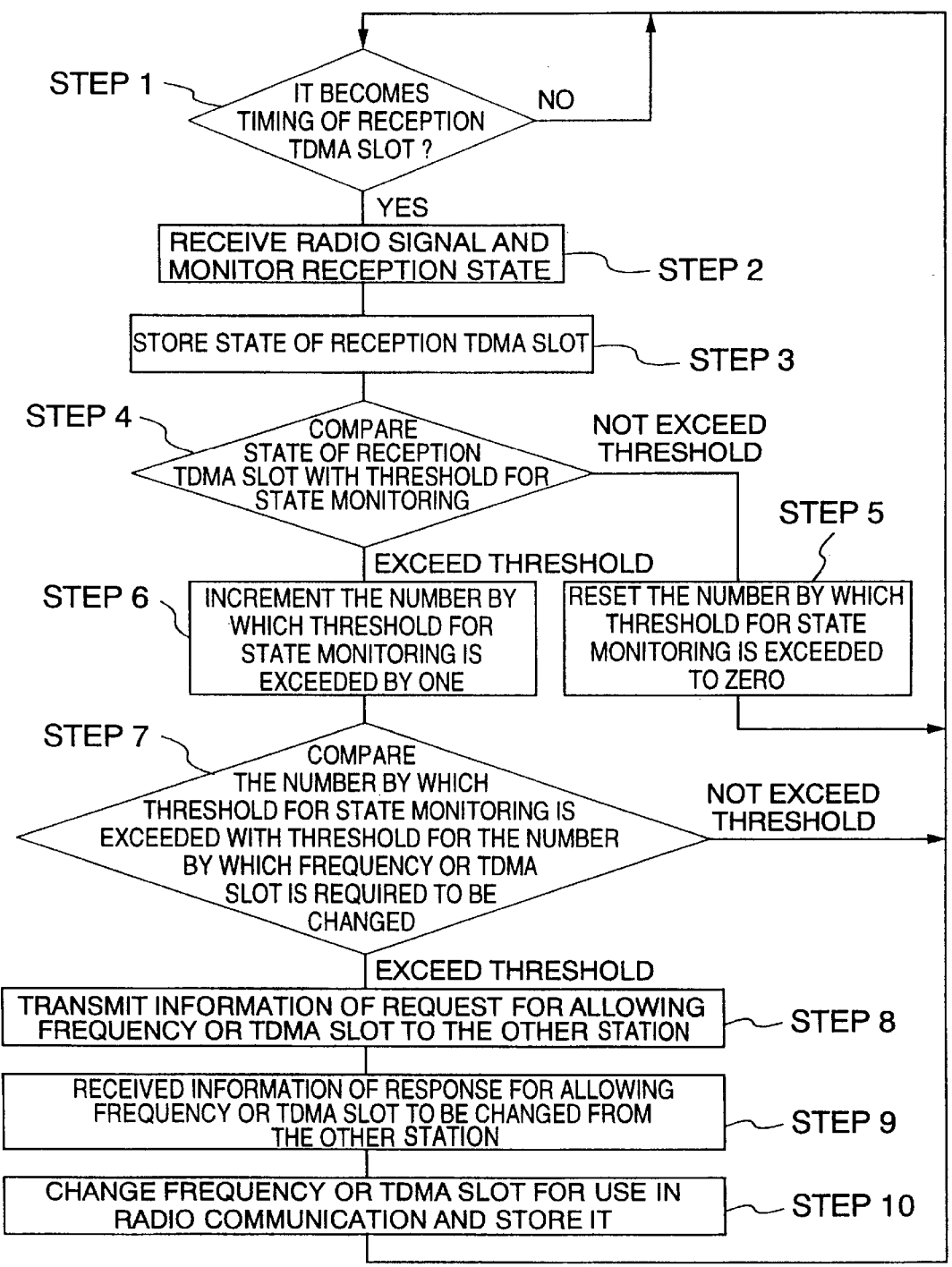
FIG. 9 is a flow chart useful in explaining the operation of the radio communication apparatus shown in FIG. 7.

Next, the description will hereinbelow be given with respect to the control by the first control unit 303 in the operation of monitoring the state of the transmission TDMA slot by the private station 3001 according to the present embodiment with reference to FIG. 6.

Firstly, it is judged whether or not the current timing is the timing of the transmission TDMA slot the data of which is stored in the first storage unit (Step 201). If so, then the processing proceeds to Step 202. If not, then the processing is returned to Step 201.

When it is judged in Step 201 that the processing proceeds to Step 202, the data relating that timing is stored in the sixth storage unit 313 and then one data is fetched from the table (Step 202).

When the data thus fetched does not represent the timing at which the state of the transmission TDMA slot is monitored (Step 203), the processing proceeds to Step 204. When the data represents that timing, the processing proceeds to Step 205.

Now, when it is judged in Step 203 that the processing proceeds to Step 204, the first radio signal processing unit 302 is controlled so as to carry out the operation of monitoring the state of the transmission TDMA slot.

On the other hand, when it is judged in Step 203 that the processing proceeds to Step 205, the first radio signal processing unit 302 is controlled so as to carry out the transmission operation.

While the present invention has been described in its preferred embodiments, it is to be understood that the words which have been used are words of description rather than limitation and that changes within the purview of the appended claims may be made without departing from the true scope and spirit of the present invention in its broader aspects.

What is claimed is:

1. A digital radio communication apparatus employing time division multiple access comprising:
    a transmission unit for transmitting a signal at a predetermined transmission timing and at a predetermined frequency on the basis of time division multiple access;
    a reception unit for receiving the signal at said predetermined timing and at the same frequency as that of said transmission unit on the basis of time division multiple access, said reception unit receiving the signal at the transmission timing of said transmission unit;
    a storage unit for storing therein information which is used to decide whether or not a transmission operation is to be carried out at the timing at which the transmission operation is to be carried out by said transmission unit; and
    a control unit for fetching the information from said storage unit when it becomes the timing at which the transmission operation is to be carried out by said transmission unit, deciding whether or not the transmission operation is to be carried out by said transmission unit, and as the result of the decision, when it is decided that the transmission operation is to be carried out, controlling said transmission unit so as not to transmit the signal and also controlling said reception unit so as to receive the signal at the timing at which the transmission operation is to be carried out by said transmission unit.

2. A digital radio communication apparatus according to claim 1, wherein said control unit changes the timing, at which the transmission operation is to be carried out by said transmission unit, in accordance with the contents of the received signal from said reception unit when said reception unit is controlled so as to receive the signal at the timing at which the transmission operation is to be carried out by said transmission unit.

3. A digital radio communication apparatus employing time division multiple access comprising:
    a transmission unit for transmitting a signal at a predetermined transmission timing and at a predetermined frequency on the basis of time division multiple access;
    a reception unit for receiving the signal at said predetermined timing and at the same frequency as that of said transmission unit on the basis of time division multiple access, said reception unit receiving the signal at the transmission timing of said transmission unit; and
    a control unit for controlling said transmission unit so as not to transmit the signal and also controlling said reception unit so as to receive the signal at the timing at which the transmission operation is to be carried out by said transmission unit whenever a value relating to the timing at which the transmission operation is to be carried out by said transmission unit is counted by a predetermined number, said control unit changing the timing at which the transmission operation is to be carried out by said transmission unit in accordance with the contents o the received signal from said reception unit when said reception unit is controlled so as to receive the signal at the timing at which the transmission operation is to be carried out by said transmission unit.

4. A digital radio communication apparatus employing time division multiple access comprising:
    a transmission unit for transmitting a signal at a predetermined transmission timing and at a predetermined frequency on the basis of time division multiple access;
    a reception unit for receiving the signal at said predetermined timing and at the same frequency as that of said transmission unit on the basis of time division multiple access, said reception unit receiving the signal at the transmission timing of said transmission unit; and
    a control unit for controlling said transmission unit so as not to transmit the signal and also controlling said reception unit so as to receive the signal at the timing at which the transmission operation is to be carried out by said transmission unit whenever a value relating to the timing at which the transmission operation is to be carried out by said transmission unit is counted by a predetermined number, said control unit changing the timing at which the transmission operation is to be carried out by said transmission unit whenever a value of the signal, which has been received by said reception unit when said reception unit is controlled so as to receive the signal at the timing at which the transmission operation is to be carried out by said transmission unit, exceeds a predetermined value.

5. A digital radio communication apparatus employing time division multiple access comprising:
    a transmission unit for transmitting a signal at a predetermined transmission timing and at a predetermined frequency on the basis of time division multiple access;
    a reception unit for receiving the signal at said predetermined timing and at the same frequency as that of said transmission unit on the basis of time division multiple access, said reception unit receiving the signal at the transmission timing of said transmission unit; and
    a control unit for controlling said transmission unit so as not to transmit the signal and also controlling said reception unit so as to receive the signal at the timing at which the transmission operation is to be carried out by said transmission unit whenever a value relating to the timing at which the transmission operation is to be carried out by said transmission unit is counted by a predetermined number, said control unit including a storage unit for storing therein the number by which a value of the signal, which has been received by said reception unit when said reception unit is controlled so as to receive the signal at the timing at which the transmission operation is to be carried out by said transmission unit, exceeds a predetermined value; and
    wherein said control unit counts a value stored in said storage unit whenever the value of the signal, which has been received by said reception unit when said reception unit is controlled so as to receive the signal at the timing at which the transmission operation is to be carried out by said transmission unit, exceeds the predetermined value, and also changes the timing, at which the transmission is to be carried out by said transmission unit, whenever the counted value exceeds a predetermined value.

* * * * *